Patented Apr. 25, 1939

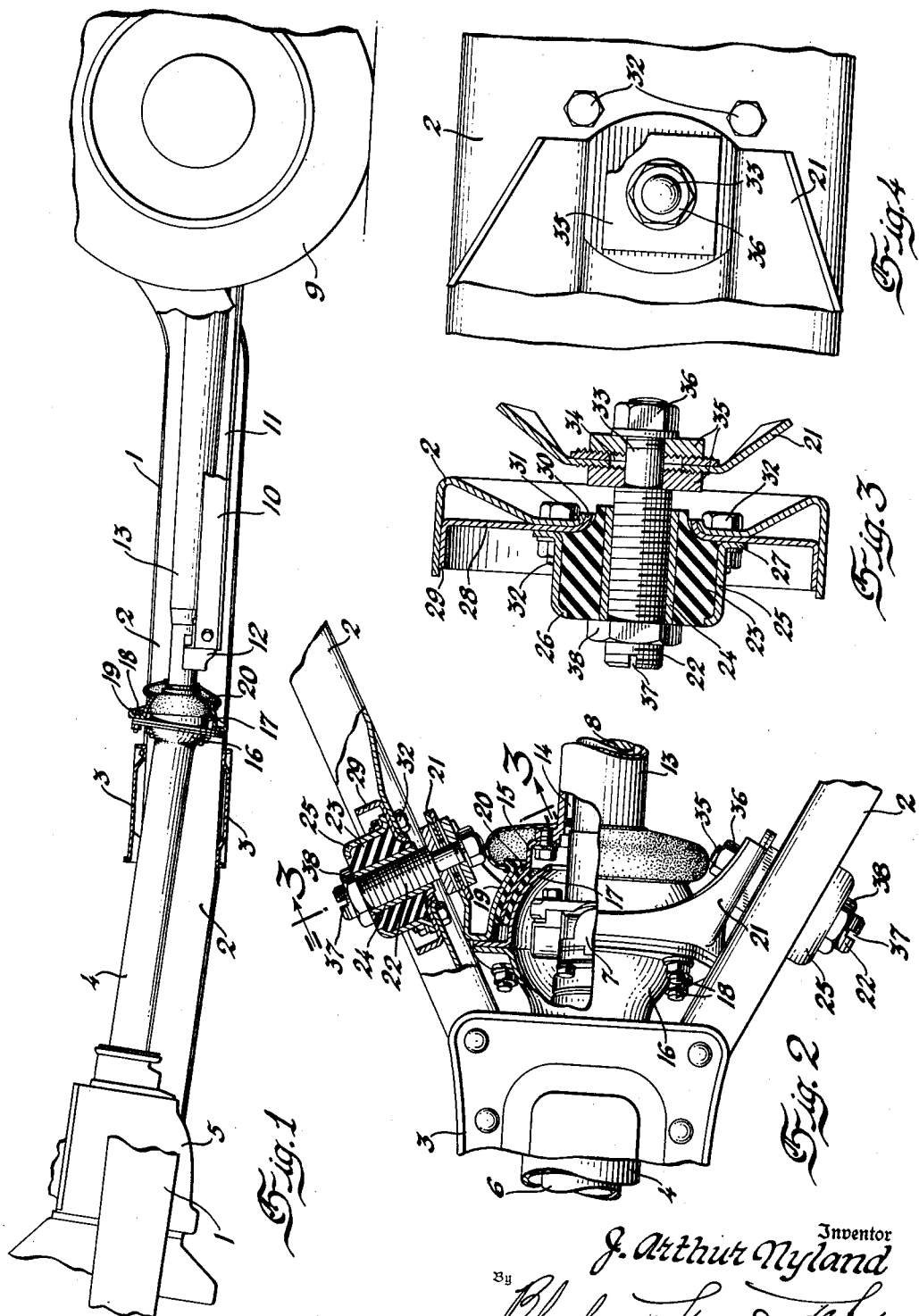

2,155,953

UNITED STATES PATENT OFFICE 2,155,953

PROPELLER SHAFT MOUNTING

John Arthur Nyland, Flint, Mich., assignor to General Motors Corporation, Detroit, Mich., a corporation of Delaware Application July 20, 1938, Serial No. 220,301

8 Claims. (Cl. 180—85)

This invention relates to motor vehicles and more particularly to the running gear and drive assembly. In automotive design the present trend is toward the use of sectional propeller shafts with a center bearing supported on the chassis frame, the present invention having for its object the provision of an improved mounting which includes a two-way adjustment for properly centering and locating the parts and a cushion for insulating the frame from the running gear. The invention furthermore aims to provide an inexpensive, easily installed and care-free structure.

A specific embodiment of the invention is disclosed in the accompanying drawing wherein Figure 1 is a side elevation showing a fragment of a chassis frame and the propeller drive shafting; Figure 2 is a plan view with parts of the ball joint mounting in section; Figure 3 is an enlarged sectional view taken on line 3—3 of Figure 2 and Figure 4 is an elevation of the parts shown in Figure 3.

The drawing shows the application of the invention to the torque tube type of drive employed on Buick automobiles for the purpose of illustration and it will be understood that the mounting will be useful in other installations and with various types of running gear. The chassis frame is of the well known X-type and includes a pair of longitudinal channels 1—1 with cross bars 2—2 joined at their apices by upper and lower plates 3—3. Projecting through the tunnel afforded by the plates 3—3 is the hollow tube 4 rigidly mounted on the rear of the transmission casing 5 constituting a part of the power plant or engine assembly. The engine is supported in the front of the frame in any conventional manner and preferably is insulated through the use of suitable rubber mountings.

Enclosed by the hollow tube 4 and slidably splined to the power plant output shaft is the forward propeller shaft section 6 having a universal joint connection 7 with the rear propeller shaft section 8. The shaft section 8 is geared to a differential enclosed within an axle housing for driving the rear wheels 9 as is customary. Between the axle assembly and chassis frame it is proposed to employ coil springs for flexibly sustaining the load of the suspended structure. Such springs may rest on seats located directly above or on either side of the axle housing but preferably behind the axle housing on extensions of a pair of rearwardly diverging distance rods 10 and 11 which at the rear are bolted either rigidly or through cushioned rubber connections to the axle housing near the wheels and at the front are joined to a bracket 12 welded to the drive shaft 8 and the front end of the torque tube 13 enclosing the member.

At the front of the torque tube assembly a roller bearing 14 supports the shaft 8 and beyond the bearing is secured an axle thrust transmitting ball member 15 fitted to a mating ball member on the rear of the tube 4 for accommodating deflection of the load supporting springs and relative movement of the axle assembly about the torque ball center coincident with that of the universal drive joint 7 housed therein. For convenience of assembly the torque ball member on the tube 4 consists of an integral outwardly flared end section 16 and a separable section 17 both having peripheral flanges held together by a series of bolts 18 with the section 17 fitting interiorly of the ball member 15. The bolts 18 also fasten the pressed metal ball retainer 19 fitted exteriorly of the ball member 15. Instead of having the metal surfaces of the torque ball joint slidably engaging one another there may be interposed an isolating liner 20 of rubber or the like.

For mounting the torque ball on the chassis the retainer 19 carries a pair of rearwardly projecting arms 21—21 on opposite sides of the shaft center line in divergently related planes parallel to the diagonal frame members 2—2 for attachment thereto by the studs 22. For insulation of the parts it is proposed that the mounting include a cushion of elastic deformable material such as rubber. In the arrangement illustrated the rubber is in the nature of a cylindrical sleeve 23 interposed between inner and outer metal tubes 24 and 25, the inner tube having threaded engagement with the mounting stud 22. If desired the rubber may be pre-loaded between the tubes and preferably it is vulcanized or otherwise bonded as a unit with both tubes. One end of the outer tube 25 is flanged inwardly as at 26 over the end face of the rubber collar and the other end has an outturned flange 27 for attachment to a plate 28 nested within the channel of the frame member 2. The plate 28 is bounded by a reinforcing flange 29 which at the top and bottom fits the flanges of the frame channel as seen in Figure 3. It extends over the opposite face of the rubber collar 23 and has a central aperture through which a projected skirt of the rubber extends and which is defined by a lateral flange 30 fitted to a similar flange 31 surrounding an opening in the frame bar 2. A series of fastening bolts 32 pass through the frame member 2, the mounting plate 28 and the flange 27. In this fashion the frame resiliently supports the mounting stud 22 adjustably carried by the rubber embedded tubular sleeve 24.

Beyond the sleeve 24 the stud 22 is shouldered and has a reduced extension 33 for attachment to the mounting arm 21 of the torque ball joint. The stud receiving opening in the arm consists of an oversize hole 34 and the opposite faces of the arm adjacent the hole are serrated to seat the serrations in a pair of clamping washers 35 interposed between the stud shoulder and the nut 36 threaded on the end of the extension 33. By this arrangement the serrated clamping washers 35 hold between them the arm 21 in whatever position to which it may be set within the limits of the enlarged opening 34. Before the nut 36 associated with the respective mountings is drawn tight the torque ball joint can be adjusted or shifted vertically to a proper set position. Likewise it can be moved in a horizontal plane for centering the asembly through relative adjustment of the mounting studs 22. To facilitate stud adjustment its outer end may be squared or otherwise formed for gripping engagement by the hand or suitable tool. In the drawing it is shown with a screw driver slot 37. Additionally the drawing illustrates the use of a jam nut 38 for locking the stud in adjusted position.

In use the braking and driving torque of the axle is taken through the rubber cushions connecting to the frame the torque ball assembly associated with the axle third member. Driving thrust transmitted through the torque tube reaches the chassis partially through the torque ball mounting and partially through the rigid tube 4 and power plant mounting. Optionally the arrangement can be such that all driving force is transmitted through the torque ball mounting. It will be apparent that the structure accommodates variation in the position of the torque ball relative to the frame and increases the range of allowable manufacturing tolerances.

I claim:

1. In a motor vehicle, the combination with an axle third member and a chassis member of a universally adjustable connection between the third member and chassis member comprising an element engageable with one of said members and adjustable in a given direction relative thereto to a selected set position and engageable also with the other member and adjustable relative thereto in a direction angularly related to the first mentioned direction of adjustment and means to retain the element and last mentioned member in selective set position.

2. In combination, an axle third member, an axle suspended structure, a connecting device joined to said axle third member for movement relative thereto in one direction, means to set the device in selective adjusted position relative to the member, means joining the device to the axle suspended structure for movement relative thereto in a direction angularly related to the first mentioned direction and means to lock said device in selective set position relative to the axle suspended structure.

3. In a motor vehicle having an axle third member connected to the chassis, a connecting joint arranged for adjustment of the third member relative to the chassis in angularly related directions and a cushion of elastic deformable material incorporated in said joint.

4. In combination, a chassis frame, a drive shaft having a bearing support, a member adjustably connected to the support for adjustment in one direction, means connecting the member to the frame for adjustment transversely of the before-mentioned adjustment and insulation material associated with one of the connections.

5. In a motor vehicle, a propeller shaft ball assembly having a pair of spaced extensions, a mounting stud associated with each extension and projected through an oversize opening therein, means to clamp the stud to the extension in selected position within said opening, a member threaded on the stud for adjustment of the stud relative thereto, an insulating collar surrounding the member and a frame mounting bracket enclosing said collar.

6. In a motor vehicle, a propeller shaft assembly, a mounting stud shiftable laterally within an oversize opening in the assembly, means to clamp the stud in selected position within the opening, a sleeve threadedly engaging the stud for transverse adjustment of the sleeve, a rubber collar embracing the sleeve and a frame supported bracket containing said sleeve.

7. In a motor vehicle having a chassis and a propeller shaft assembly to be supported thereby, a cushion connection between the chassis and the assembly capable of longitudinal and transverse adjustment to set the relative position of the chassis and assembly, said connection including a frame bracket enclosing a rubber collar and a sleeve mounted within the collar, a stud threadedly engaged with the sleeve to effect transverse adjustments and projected through and shiftable within an enlarged opening in the assembly for effecting longitudinal adjustments and means for clamping the stud to the assembly in adjusted position.

8. In a motor vehicle having an axle supported structure, a torque tube ball joint to be mounted thereon, a torque tube connected at its end to an element of the joint, a pair of divergent distance rods connected at one end with said torque tube and adapted for connection at their opposite ends with the axle, and a pair of transversely spaced rubber joints mounting the ball joint in the axle supported structure for the transmission of axle drive therethrough.

JOHN ARTHUR NYLAND.